US008892739B2

(12) United States Patent
Bell et al.

(10) Patent No.: US 8,892,739 B2
(45) Date of Patent: Nov. 18, 2014

(54) ENABLING AND MANAGING USER-SPECIFIED ALIASES

(75) Inventors: Denise A. Bell, Austin, TX (US);
Pamela F. Geiger, Apex, NC (US);
Oriana J. Love, Austin, TX (US);
Irgelkha Mejia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/116,399

(22) Filed: May 26, 2011

(65) Prior Publication Data
US 2012/0303813 A1  Nov. 29, 2012

(51) Int. Cl.
*G06F 15/173* (2006.01)
*H04L 29/08* (2006.01)

(52) U.S. Cl.
CPC ............ *H04L 67/1097* (2013.01); *H04L 67/14* (2013.01)
USPC ....................................................... 709/226

(58) Field of Classification Search
CPC ................................................. H04L 29/08144
USPC .......... 707/741, 747; 709/206, 223, 224, 226, 709/229, 245
See application file for complete search history.

(56) References Cited

U.S. PATENT DOCUMENTS

| | | | |
|---|---|---|---|
| 6,216,162 B1 | 4/2001 | Dutcher et al. | |
| 6,665,304 B2 * | 12/2003 | Beck et al. | 370/401 |
| 7,284,232 B1 | 10/2007 | Bates et al. | |
| 7,447,756 B2 * | 11/2008 | Malik | 709/223 |
| 7,664,831 B2 * | 2/2010 | Cartmell et al. | 709/219 |
| 7,689,628 B2 * | 3/2010 | Garg et al. | 707/793 |
| 7,783,741 B2 * | 8/2010 | Hardt | 709/224 |
| 7,818,428 B1 | 10/2010 | Lavallee et al. | |
| 7,818,455 B2 * | 10/2010 | Haffner | 709/245 |
| 7,984,484 B1 * | 7/2011 | Rakowski et al. | 726/3 |
| 8,260,893 B1 * | 9/2012 | Bandhole et al. | 709/223 |
| 8,601,484 B2 * | 12/2013 | Salsbery et al. | 718/106 |
| 8,615,796 B2 * | 12/2013 | Hopen et al. | 726/13 |
| 2002/0049675 A1 * | 4/2002 | Kailamaki et al. | 705/44 |
| 2002/0152272 A1 | 10/2002 | Yairi | |
| 2003/0220977 A1 * | 11/2003 | Malik | 709/206 |
| 2005/0055306 A1 * | 3/2005 | Miller et al. | 705/37 |

(Continued)

FOREIGN PATENT DOCUMENTS

EP   1821228 A2   8/2007

OTHER PUBLICATIONS

Znati, Taieb B. et al., A Simulation Based Analysis of Naming Schemes for Distributed Systems, ANSS '92 Proceedings of the 25th annual symposium on Simulation, 1992, pp. 42-51, IEEE Computer Society Press, Los Alamitos, California, United States.

(Continued)

*Primary Examiner* — Chirag Shah
*Assistant Examiner* — Jael Ulysse
(74) *Attorney, Agent, or Firm* — Patterson & Sheridan, LLP

(57) ABSTRACT

Techniques are described for suggesting aliases for a resource within a computing environment based on user-provided aliases for the resource. Embodiments determine a plurality of user-provided aliases for the resource and generate a suggested alias for the resource based on the plurality of user-provided aliases. The suggested resource may be provided to a user of the computing environment. The suggested alias is then associated with the resource, such that the user may refer to the resource using the suggested alias for the resource.

17 Claims, 5 Drawing Sheets

(56) References Cited

U.S. PATENT DOCUMENTS

| | | |
|---|---|---|
| 2005/0108618 A1 | 5/2005 | Gnaedig |
| 2005/0114453 A1* | 5/2005 | Hardt ............................ 709/206 |
| 2005/0204011 A1 | 9/2005 | Velayudham |
| 2007/0067510 A1 | 3/2007 | Gladfelter |
| 2008/0134183 A1 | 6/2008 | Somogyi et al. |
| 2009/0006492 A1* | 1/2009 | Heix et al. ..................... 707/201 |
| 2009/0063562 A1 | 3/2009 | Dinger et al. |
| 2009/0144300 A1* | 6/2009 | Chatley et al. ................ 707/100 |
| 2009/0216869 A1* | 8/2009 | Kennedy ....................... 709/223 |
| 2009/0327502 A1* | 12/2009 | Brewer et al. ................ 709/229 |
| 2010/0088753 A1* | 4/2010 | Ayres et al. ....................... 726/9 |
| 2010/0293205 A1 | 11/2010 | Baker et al. |
| 2011/0179040 A1* | 7/2011 | Bessonov et al. ............. 707/747 |
| 2012/0016938 A1* | 1/2012 | Gallant ........................ 709/204 |
| 2012/0303629 A1* | 11/2012 | Klein et al. ................... 707/741 |

OTHER PUBLICATIONS

IBM TDB, Method for Browsing Aliases and Network Names, IBM Technical Disclosure Bulletin, Jul. 1995, pp. 51-52, vol. 38, No. 07, International Business Machines, Inc., Armonk, New York, United States.

* cited by examiner

ENABLING AND MANAGING USER-SPECIFIED ALIASES

BACKGROUND

The present invention relates in general to the field of computers and similar technologies, and in particular to software utilized in this field.

One technique for managing multiple configuration items (hereinafter referred to as "resources") in a computing environment is through the use of a Configuration Management Database (or "CMDB"). Generally speaking, such a resource may be hardware and/or software entity within a computing environment. Examples of such resources include, without limitation, switches, routers, printers, storage devices, computer systems, software applications, and application packages.

Along with representing and storing relationships between resources, one purpose of the CMDB is to provide a correlation mechanism between resources. For example, two management products may discover a single computer system and yet call the single computer system different names. Thus, it is important to represent this single computer system as a single resource within the CMDB. In order to foster consistent identification of resources in the CMDB, a CMDB Common Data Model ("CDM") formally defines the ways in which each type (or class) of resource is identified through the use of naming rules. These rules list the potential attributes that provide identifying characteristics, the combination of those attributes that are needed to identify the resource, and what the context is that makes that combination unique. For example, there might be a rule that says that combining "Manufacturer," "MachineType," "Model," and "SerialNumber" give a unique identification of a computer system. For some types of resources, a simple combination of attributes is not sufficient to uniquely identify a resource without some other context. For example, the drive letter (e.g., "C:") of a logical disk is not sufficient to give a unique identification without further context. However, such a drive letter is unique within the context of an Operating System instance.

While such rules may uniquely identify the resources, the rules do not always produce user-friendly names for the resources. For instance, where a rule states that the "Manufacturer," "MachineType," "Model," and "SerialNumber" of a computer system could be combined to produce a unique name for the computer system, the resulting name may not be convenient for users to work with. That is, a name generated according to the aforementioned rule may be substantially lengthy in nature, making it inconvenient for users to utilize it for operations involving the computer system. Furthermore, such a generated name may not be intuitive to users, as they may not know the model type or serial number of the computer system without consulting reference material for the computer system. As such, users may be allowed to assign a user-specific name (also referred to herein as an "alias") to a resource. However, as different users may assign different aliases to the same resource, this may create confusion when the users communicate regarding the resource. For instance, a first user may refer to a computer system using the alias "ws1par1" while a second user may refer to the same computer system using the alias "websphere1." If the first user then asks the second user to perform an operation on "ws1par1", the second user may be confused as to which computer system the first user is referring to.

SUMMARY

Embodiments of the invention provide a method, computer program product and system for managing resources in a computing environment having a plurality of users. The method, computer program product and system include determining a plurality of user-provided aliases for a first resource of the computer system. Here, each user-provided alias in the list is associated with a respective user from the plurality of users of the computer system. Additionally, the method, computer program product and system include generating a suggested alias for the first resource of the computing environment based on the determined plurality of user-provided aliases. The method, computer program product and system also include, responsive to a request from a first user specifying the first resource, providing the suggested alias for the first resource to the first user. Furthermore, the method, computer program product and system include associating the suggested alias with the first resource, such that the first user can refer to the first resource of the computing environment using the suggested alias.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
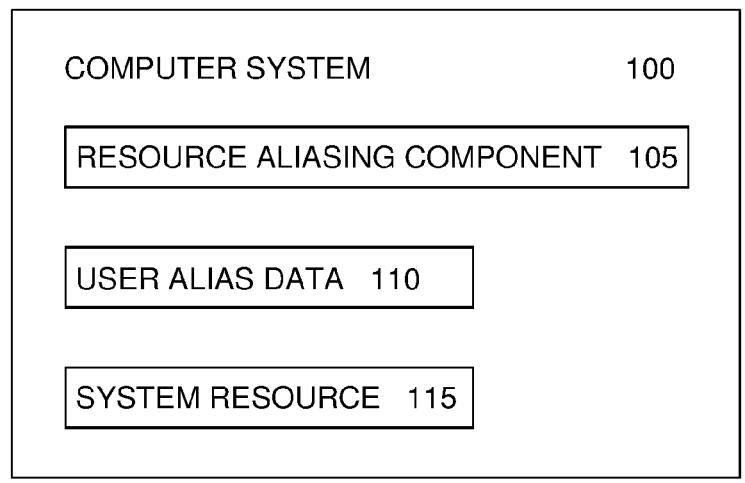
FIG. 1 is a block diagram illustrating a system configured with a resource aliasing component, according to one embodiment of the present invention.

Embodiments of the invention generally provide suggested aliases for a resource to a particular user in a computing environment. Embodiments may identify a plurality of user-defined aliases for the resource. That is, for each of a plurality of users within the computing environment, embodiments may determine whether the user has defined a user-specific alias for the resource, and if so, determine what alias name the user has defined for the resource. For instance, a first user may refer to a computer system using the alias "ws1par1" while a second user may refer to the same computer system using the alias "websphere1." Embodiments may be configured to examine every user of the computing system. In an alternate embodiment, only a subset of the users of the computing system is examined. For instance, such an embodiment may only consider other users having some sort of relationship with the particular user for which the suggested alias is generated.

Once the plurality of user-defined aliases for the resource is identified, embodiments generate a suggested alias for the resource for the particular user. The suggested alias for the resource is generated based on, at least in part, the determined plurality of user-defined aliases for the resource. In one embodiment, the suggested alias is generated further based on a respective popularity of each of the user-defined aliases. For instance, continuing the above example, if a majority of users refer to the computer system using the alias "ws1par1", while a minority of users refer to the computer system using the alias "websphere1", embodiments may generate a suggested alias of "ws1par1" for the resource. In a particular embodiment, the suggested alias is generated based on a popularity of only the user-defined aliases created by users having some association with the particular user. For example, if the first user has the title of "network admin", embodiments may determine what the most popular user-defined alias is for users having the same title (i.e., amongst other network administrators).

Once the suggested alias is generated, embodiments of the invention provide the suggested alias for the resource to the particular user. In one embodiment, a plurality of suggested aliases is provided to the first user. Additionally, embodiments may output for display an indication of the respective popularity of each suggested alias amongst other users of the computing environment. In one embodiment, the indication of the respective popularity of each suggested alias may be measured within a group of users having some relationship with the first user. For instance, if the first user is a network administrator, embodiments could indicate the popularity of each suggested alias amongst other network administrators in the computing environment. In addition to providing the suggested alias for the resource to the particular user, embodiments may associate the suggested alias with the resource, such that the particular user may use the suggested alias to refer to the resource. Advantageously, doing so provides users with aliases for resources of the computing environment which may assist the users in referring to the resources. This, in turn, may make the user's work involving the resources more convenient and efficient. Additionally, embodiments may help to ensure that users of the computing environment refer to the same resource in the same way. This aids in communication between the users regarding the resource by preventing confusion caused by the users referring to the resource using different aliases.

In one embodiment, the user-defined aliases are analyzed to determine one or more data elements included in the user-defined aliases. For example, for the exemplary aliases given above of "ws1par1" and "websphere1", embodiments may determine that both aliases contain a first data element that refers to an application package (i.e., the WebSphere application server) and a second data element that refers to an instance of the application package (i.e., instance 1). Accordingly, embodiments may generate a suggested alias based on these common data elements between the user-defined aliases. Advantageously, by doing this, embodiments may identify trends of data elements amongst the plurality of user-defined aliases and thus identify patterns of user-defined aliases, even when the user-defined aliases are not formatted in the same way.

In yet another embodiment, a listing of all user-defined aliases may further be displayed to the user. In such an embodiment, the listing may be sorted in a particular order (e.g., based on a respective popularity of each user-defined alias). Such a listing may be useful, for instance, to a administrator of the computing environment, as the listing provides information to the administrator about how users of the computing environment are aliasing resources within the environment. For instance, the administrator may examine the list to determine not only what alias formats users are following, but also what data users are including in the aliases. The administrator may then use this information to, for example, define default aliases for additional resources of the computing environment or to develop aliasing standards for use within the computing environment.

Referring now to FIG. 1, FIG. 1 is a block diagram illustrating a system configured with a resource aliasing component, according to one embodiment of the present invention. As shown, the computer system 100 includes a resource aliasing component 105, user alias data 110 and a system resource 115. Generally, the resource aliasing component 105 may generate suggested aliases for the system resource 115. The user alias data 110 includes information on user-specified aliases for the system resource 115. As used herein, a "resource" (e.g., the system resource 115) refers to any hardware and/or software entity to which an alias may be assigned. Examples of such a system resource 115 include, without limitation, a switch, a router, a printer, a storage device, a computer system (virtual or physical), a software application, and an application package (e.g., a web application server).

The resource aliasing component 105 may analyze the user alias data 110 to determine a plurality of user-specified aliases for the system resource 115. The resource aliasing component 105 may then generate a suggested alias for the system resource 115, based on the determined plurality of user-specified aliases. Upon receiving a request from a first user to access the system resource 115, the resource aliasing component 105 may prompt the first user with the suggested alias for the system resource 115. Additionally, the resource aliasing component 105 may associate the suggested alias with the system resource 115, such that the first user may refer to the system resource 115 using the suggested alias.

In one embodiment, the resource aliasing component 105 is configured to further determine a respective popularity of each of the user-specified aliases and to generate the suggested alias further based on the determination of popularity. As an example, the resource aliasing component 105 may determine that 80% of users refer to the system resource 115 using a first alias while the remaining 20% of users refer to the system resource 115 using some other alias. Based on this determination, the resource aliasing component 105 may generate a suggested alias matching the first alias for the system resource 115. Advantageously, by generating the suggested alias based on a measurement of popularity amongst the user-specified aliases, embodiments of the invention help to promote consistency in how the users refer to the system resource 115. This, in turn, may improve communication between the users by reducing any confusion caused by the users referring to the system resource 115 with different names.

In a particular embodiment, the resource aliasing component 105 analyzes user data for the users of the computing environment to determine one or more groups of users. The user data may specify information such as a role or a task for each of the users. The resource aliasing component 105 may analyze this data to identify groups of users having similar roles or tasks. For instance, the resource aliasing component 105 may determine that all users having the role of "programmer" should be assigned to a particular group. In an alternate embodiment, the groups of users may be explicitly specified in the user data. For instance, the resource aliasing component 105 could be configured to look at a group to which the users belong for another purpose (e.g., file permissions). As an example, the user data could specify that a particular user belongs to the "WebSphere Application Development" group, and so the resource aliasing component 105 could place the user in a more specific group than a general "programmer" group based on the user's specified role.

In yet another embodiment, the resource aliasing component 105 is configured to look the tasks each user is responsible for. For instance, assume a particular user is a member of a "WebSphere Application Development" team but is tasked solely with the responsibility of handling database integration for web applications. In such an example, the resource aliasing component 105 could determine that the particular user should be placed in a group with database administrators and other database-related personnel based on the particular user's assigned task. Of course, these examples are provided for illustrative purposes and without limitation. Moreover, it is explicitly contemplated that any technique for identifying groups of users consistent with the functionality described herein may be used.

Once the groups of users are identified and upon receiving the request from the first user to access the system resource 115, the resource aliasing component 105 may determine which group of users the first user is most similar to. For instance, the resource aliasing component 105 could look at user data for the first user and assign the first user to a group whose members have a similar roles and/or tasks as the first user. As another example, the user data could explicitly specify a group of users to which the first user belongs. The resource aliasing component 105 may then generate the suggested alias for the system resource 115, based on the selected group. For instance, the resource aliasing component 105 could identify the most popular (i.e., the most frequently used) alias for the resource 115 amongst members of the group and use that alias as the suggested alias. Advantageously, doing this helps to ensure that the suggested alias generated for the first user matches aliases used by the first user's peers for the system resource 115.

Figure 2:
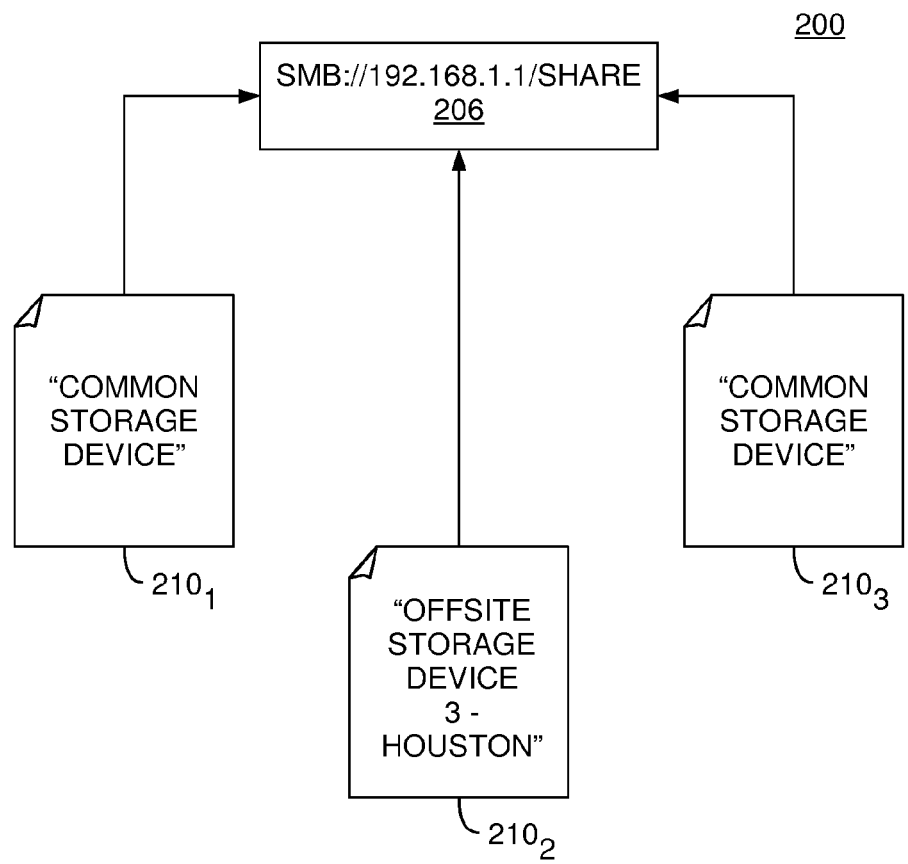
FIG. 2 is a diagram illustrating a plurality of aliases for a resource, according to one embodiment of the present invention.

As an example, FIG. 2 is a diagram illustrating a plurality of aliases for a resource, according to one embodiment of the present invention. As an example, the diagram 200 shows a system resource 206. In this example, the system resource 206 depicted is a network file share having the address of "SMB://192.168.1.1/share". Additionally, three user-provided aliases 210 for the system resource 206 are shown. For instance, the diagram 200 shows that two users have defined user-specific aliases of "Common Storage Device" $210_1$ and $210_3$ for the network file share 206, while a third user has defined a user-specific alias of "Offsite Storage Device 3—Houston" $210_2$ for the resource 206. This example, of course, is without limitation and is provided for illustrative purposes only. Moreover, one of ordinary skill in the art will quickly recognize that any resource and user-provided aliases consistent with the description and functionality included herein may be used in accordance with embodiments of the invention.

As described above, when the resource aliasing component 105 receives a request specifying the resource 206 from a fourth user (e.g., a request to access the resource 206, a request to view the resource 206, etc.), the resource aliasing component 105 may generate a suggested alias for the resource 206, based on the user-provided aliases 210. In one embodiment, the resource aliasing component 105 may generate the suggested alias based on a popularity of each distinct user-provided alias 210. Thus, in the depicted example, the resource aliasing component 105 could determine that 67% of users use the alias of "Common Storage Device" for the resource 206, while only 33% of users use the alias of "Offsite Storage Device 3—Houston" for the resource 206. Accordingly, in such an embodiment, the resource aliasing component 105 could generate a suggested alias of "Common Storage Device" for the resource 206 and prompt the fourth user with the suggested alias. Upon receiving a confirmation or selection of the suggested alias from the fourth user, the resource aliasing component 105 could associate the suggested alias with the resource 206 for use by the fourth user, such that the fourth user may refer to the resource 206 using the suggested alias.

Figure 3:
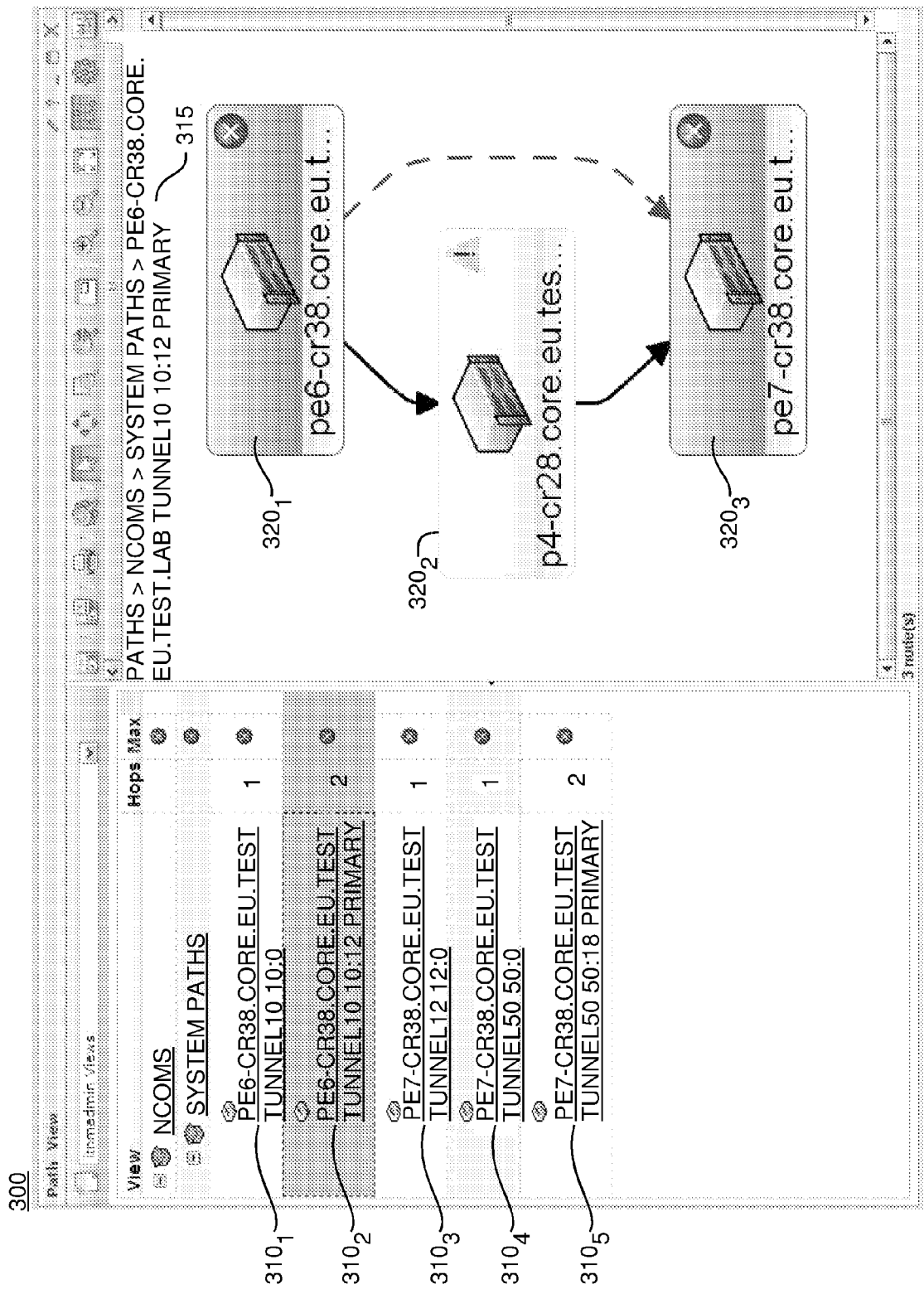
FIG. 3 is a screenshot illustrating network resources, according to one embodiment of the present invention.

Advantageously, doing so helps to promote consistency amongst aliases assigned to the resource by various users of the computing environment. This may in turn aid in communication between the users regarding the resource. Additionally, by providing aliases for the resource, embodiments of the present invention may improve the display of user interfaces showing the resources. For instance, FIG. 3 is a screenshot illustrating network resources, according to one embodiment of the present invention. More specifically, FIG. 3 depicts multiple routers in a networked computing environment. For instance, the screenshot 300 shows a listing 310 of the physical names of network devices. Here, the network device $310_2$ having the name "PE6-CR38.CORE.EU.TEST TUNNEL10 10:12 Primary" has been selected. Accordingly, the right frame of the depicted window shows additional detail about the selected network device $310_2$, which includes the full name 315 of the device and a visual depiction 320 of how the network devices are connected.

In the depicted example, the full names of the network devices have been truncated for the visual depictions 320 of the devices. As such, it may be difficult for users to distinguish one network device from another, particularly in situations where the information which uniquely identifies the network device has been truncated. For instance, the depiction $320_1$ has been truncated to include only the string "pe6-cr38.core.eu.t . . . ." As such, it may be difficult for a user viewing this display to determine whether the depiction $320_1$ refers to the network device named "PE6-CR38.CORE.EU.TEST TUNNEL10 10:12 Primary" or the network device named "PE6-CR38.CORE.EU.TEST TUNNEL10 10:10." Accordingly, in one embodiment, the resource aliasing component 105 is configured to generate a suggested alias for the resource having a length that does not exceed the maximum number of displayable characters. For instance, the resource aliasing component 105 could determine the maximum number of characters the interface shown in screenshot 300 can display and could then generate a suggested alias for the resource having a length that is less than or equal to the maximum number of displayable characters. Advantageously, doing so not only improves the usability of the resource for users (i.e., by allowing users to refer to the resource using the shorter alias name), but also improves the functionality of user interfaces displaying information related to the resource by preventing portions of the alias name from being truncated.

Figure 4:
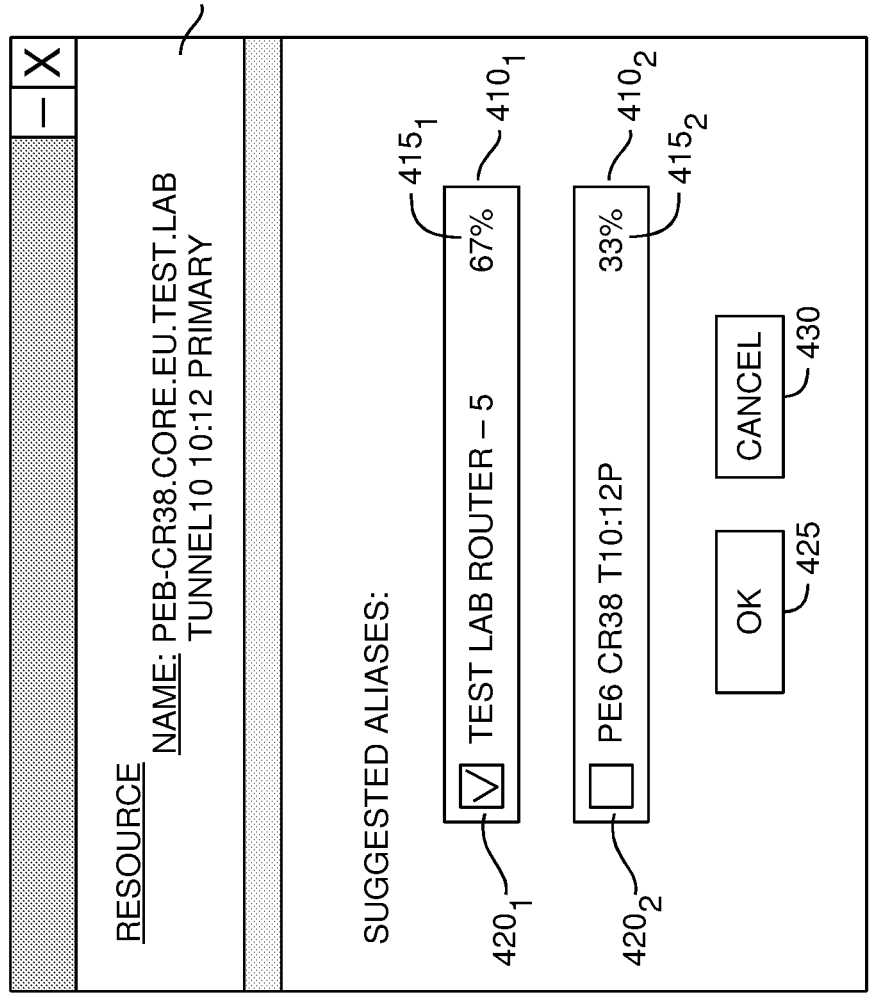
FIG. 4 is a screenshot illustrating an interface for a resource aliasing component, according to one embodiment of the present invention.

Additionally, as discussed above, the resource aliasing component 105 may be configured to generate multiple suggested aliases based on the user-provided aliases and output the generated suggested aliases to the user for selection. An example of this is shown in FIG. 4, which shows an interface for a resource aliasing component, according to one embodiment of the present invention. Of note, the screenshot 400 continues the example shown in FIG. 3 of the network device named "PE6-CR38.CORE.EU.TEST TUNNEL10 10:12 Primary", such that a plurality of suggested aliases are displayed to a first user of the computing environment. As shown, the screenshot 400 includes the physical name of the resource 405 as well as a plurality of suggested aliases 410 for the resource. Here, the resource aliasing component 105 has analyzed a plurality of user-defined resources for the network device and generated two suggested aliases 410 for the device. Additionally, the resource aliasing component 105 has determined a measurement of popularity 415 of the suggested aliases 410 amongst the user-defined aliases. Thus, in the depicted example, the interface indicates that the suggested alias $410_1$ of "TEST LAB ROUTER—5" has a 67% popularity value $415_1$, while the suggested alias $410_2$ of "PE6 CR38 T10:12P" has only a 33% popularity value $415_2$. As discussed above, such an indication of popularity may be measured amongst all the users of the computing environment or within a subset of the users (e.g., only amongst those users having a relationship with the first user).

The depicted interface 400 further contains a selection box 420 associated with each suggested alias 410. Accordingly, a user may access the selection box 420 in order to select one of the suggested aliases 410 for association with the resource. As shown, the user has accessed the selection box $420_1$ in order to select the alias of "TEST LAB ROUTER—5" for association with the resource. The screenshot 400 further contains an OK button 425 which the user may access to confirm the selection of the suggested alias $410_1$. Additionally, the screenshot 400 contains a CANCEL button 430 which the user may activate to avoid selecting a suggested alias 410 for the resource at this time. Advantageously, doing so allows a user to select the suggested alias that the user prefers. Furthermore, this provides the user with data that is useful to the user in making the selection (i.e., the popularity amongst other users in the computing environment of each suggested alias).

Figure 5:
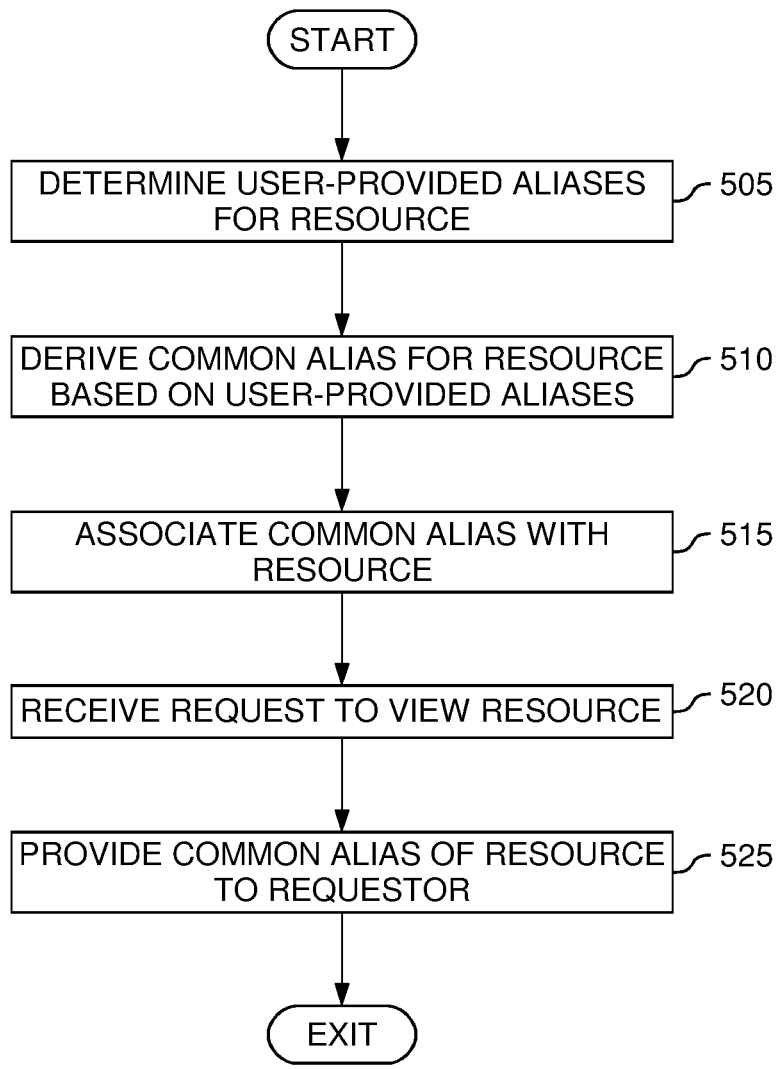
FIG. 5 is a flow diagram illustrating a method for aliasing resources, according to one embodiment of the present invention.

FIG. 5 is a flow diagram illustrating a method for aliasing resources, according to one embodiment of the present invention. Of note, the example depicted here involves generating a common alias for a resource. In such an embodiment, the common alias for the resource is generated for use by a plurality of users of the computing environment. However, as discussed above, embodiments may be configured to generate a suggested alias specific to a particular user within the computing environment. As shown, the method 500 begins at step 505, where the resource aliasing component 105 determines a plurality of user-provided aliases defined by a plurality of users for a particular resource. As discussed above, each user may define user-specific aliases for resources of the computing environment. For example, for a router having the name "pe6-cr38.core.eu.test Tunnel10 10:0", a first user may alias the router using the name "Test Lab Router—5" while a second user may alias the same router using the name "PE6 CR38 T10:12P." Thus, the resource aliasing component 105 could look at each user in the plurality of users and identify what (if any) aliases the users have defined for the resource.

Once the plurality of user-provided aliases is determined, the resource aliasing component 105 generates a common alias for the resource (step 510). More specifically, the resource aliasing component 105 generates the common alias for the resource based on the plurality of user-defined aliases. For instance, in one embodiment, the resource aliasing component 105 determines a popularity of each user-provided alias in the plurality of user-provided aliases and generates the common alias for the resource further based on the determined popularity. As an example, if a majority of users refer to the router using the alias "PE6 CR38 T10:12P", while only a minority refer to the router using the name "Test Lab Router—5", the resource aliasing component 105 could generate a common alias with the name "PE6 CR38 T10:12P".

In an alternate embodiment, the resource aliasing component 105 could determine a popularity of user-provided aliases associated with one of a subset of users. For instance, if the resource aliasing component 105 is generating a suggested alias for a particular user, the resource aliasing component 105 could first determine other users (or groups of users) having some relationship to the particular user. For instance, the resource aliasing component 105 could determine a group of users having the same or similar role to the particular user. As another example, the resource aliasing component 105 could determine a group of users to which the particular user belongs (e.g., a group of users defined for file permission purposes). The resource aliasing component 105 could then determine the popularity of only the user-specific aliases created by the related users and generate the suggested alias for the resource for the particular user based on the determined popularity.

Additionally, it is explicitly contemplated that multiple suggested aliases could be generated for the resource. For instance, the resource aliasing component 105 could generate a predetermined number of suggested aliases for the resource and allow users to choose which suggested alias they prefer to use for the resource. As an example, the resource aliasing component 105 could generate 3 suggested aliases (e.g., based on the 3 most popular user-specified aliases) and allow a users to select one of the 3 suggested aliases for use with the resource. In such an embodiment, the resource aliasing component 105 may further allow the user to select none of the suggested aliases but rather to manually specify a user-specific alias for the resource instead if the user prefers.

Once the common alias is derived based on the user-provided aliases, the resource aliasing component 105 receives a request specifying the resource from a first user of the computing environment (step 515). For instance, the request could be a request to view the resource (e.g., using the interface shown in FIG. 3). As another example, the request could be a request to access the resource. Of course, these examples are without limitation and are provided for illustrative purposes only. More generally, any type of request that specifies the resource and is consistent with the functionalities described herein may be used.

Responsive to the request specifying the resource, the resource aliasing component 105 provides the generated common alias for the resource to the requestor (step 520). For instance, the resource aliasing component 105 could output a dialog for display to the requestor, indicating that the resource may be referred to using the common alias for the resource (as opposed to the resource's name). As an example, the resource aliasing component 105 could prompt the user, stating "The device 'pe6-cr38.core.eu.test Tunnel10 10:0' may also be referred to using the alias 'PE6 CR38 T10:12P.'" Advantageously, by doing this, the resource aliasing component 105 notifies users that an alias for the resource is available for use, which is oftentimes a more convenient name for the user to use in referring to the resource.

As discussed above, in a particular embodiment, the resource aliasing component 105 generates a plurality of suggested aliases to the user. In such an embodiment, the resource aliasing component 105 could output a dialog for display to the requestor including all (or a portion) of the generated suggested aliases for the resource. Such a dialog could further include a popularity indicator for each of the suggested aliases. For instance, the resource aliasing component 105 could determine a popularity of user-specific aliases that are the same as or similar to each of the suggested aliases and include this information in the prompt to the user. Advantageously, doing so notifies the users of how other users are referring to the resource which may aid the user in selecting one of the suggested aliases for the resource.

The resource aliasing component 105 then associates the generated common alias with the resource, such that the common alias may be used to refer to the resource (step 525). In an embodiment where the resource aliasing component 105 is configured to generate a common alias for the resource for use by a plurality of users, the resource aliasing component 105 may associate the alias with the resource such that each of the plurality of users may refer to the resource using the common alias. In another embodiment where the resource aliasing component 105 is configured to generate a suggested alias for the resource for a particular user, the resource aliasing component 105 may associate the suggested alias with the resource only for purposes of the particular user. In an embodiment where a plurality of suggested aliases is displayed to the user for selection, the resource aliasing component 105 may associate only the selected suggested alias with the resource. Once the alias is associated with the resource, the method 500 ends.

Figure 6:
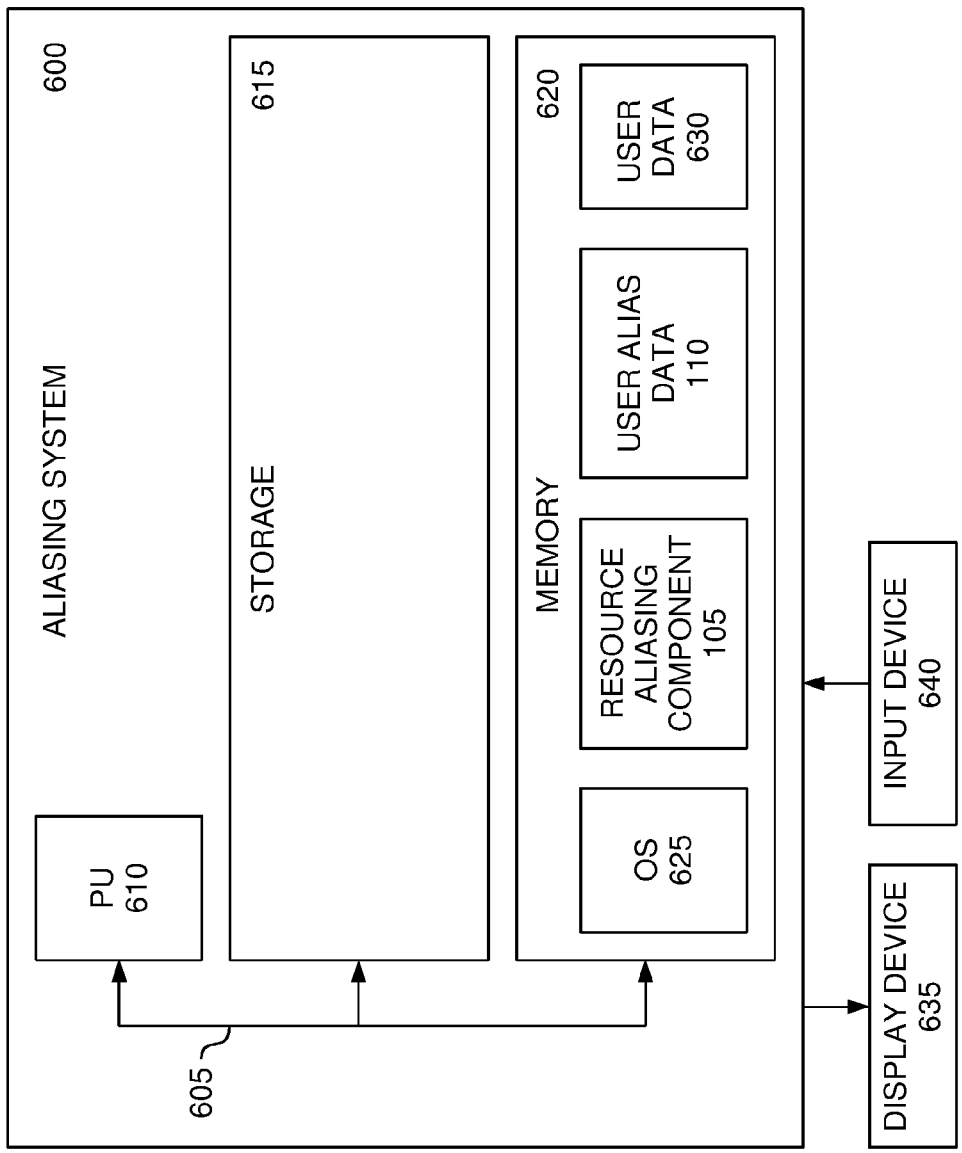
FIG. 6 is a block diagram illustrating a system configured with a resource aliasing component, according to one embodiment of the present invention.

FIG. 6 is a block diagram illustrating a system configured with a resource aliasing component, according to one embodiment of the present invention. According to embodiments of the invention, the aliasing system 600 may include existing computer systems (e.g., desktop computers), server computers, laptop computers, tablet computers, gaming consoles, and the like. The aliasing system 600 illustrated in FIG. 6, however, is merely an example of one computer system in which embodiments of the present invention may be used. Embodiments may be implemented differently, regardless of whether the computer systems are complex multi-user computing systems, such as a cluster of individual computers connected by a high-speed network, single-user workstations, or network appliances lacking non-volatile storage.

As shown, the aliasing system 600 includes a processing unit 610, which obtains instructions and data via a bus 605 from a memory 620 and storage 615. Processing unit 610 is a programmable logic device that performs instruction, logic, and mathematical processing, and may be representative of one or more CPUs. Storage 615 stores application programs and data for use by aliasing system 600. The memory 620 is any memory sufficiently large to hold the necessary programs and data structures. Memory 620 could be one or a combination of memory devices, including Random Access Memory, nonvolatile or backup memory (e.g., programmable or Flash memories, read-only memories, etc.). In addition, memory 620 and storage 615 may be considered to include memory physically located elsewhere; for example, on another computer coupled to the aliasing system 600 via bus 605.

The storage 615 includes hard-disk drives, flash memory devices, optical media and the like. The aliasing system 600 may be operably connected to a network (not shown). The memory 620 includes an operating system (OS) 625, a resource aliasing component 105, user alias data 110 and user data 630. Operating system 625 is the software used for managing the operation of the aliasing system 600. Examples of OS 625 include UNIX, a version of the Microsoft Windows® operating system, and distributions of the Linux® operating system. Furthermore, one of ordinary skill in the art will recognize that although particular components are shown as present in the memory 620 of the aliasing system 600, these components may also be contained in the storage 615 in addition to or in lieu of the memory 620. As such, the depiction of these components as present in the memory 620 is for illustrative purposes only and is without limitation.

As discussed above, the resource aliasing component 105 may process the user alias data 110 to determine a plurality of user-defined aliases for a particular resource of the computing environment. The resource aliasing component 105 may then generate a suggested alias for the particular resource for a particular user within the computing environment. For instance, the resource aliasing component 105 could process the user data 630 corresponding to the particular user and identify other users having some similarity to or association with the particular user. The resource aliasing component 105 could then generate a suggested alias for the resource for the particular user, based on the user-defined aliases for the resource created by the identified other users. The resource aliasing component 105 could then associate the suggested alias with the resource, such that the particular user may refer to the resource using the suggested alias.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the resource aliasing component 105) or related data available in the cloud. For example, the resource aliasing component 105 could execute on a computing system in the cloud and provide suggestions of resource aliases to users. In such a case, the resource aliasing component 105 could determine a plurality of user-specific aliases for a particular resource in the cloud and generate a suggested alias for the resource based on the plurality of user-specific aliases. The resource aliasing component 105 could then associate the suggested alias with the resource, such that users can refer to the resource using the suggested alias for the resource. Doing so allows a user to utilize the suggested alias for the resource from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing resources in a computing environment having a plurality of users, comprising:

determining a plurality of user-provided aliases for a first resource of the computing environment, wherein each user-provided alias in the plurality of user-provided aliases is defined, by a respective user from the plurality of users of the computing environment, as an alias for the first resource that is local to the respective user, wherein each user is associated with one of a plurality of user groups, and wherein each distinct user-provided alias in the plurality of user-provided aliases is associated with a respective popularity value reflecting a frequency of use of the respective user-provided alias, wherein the first resource is not a user account;

generating, by operation of one or more computer processors, a suggested alias for the first resource for each of the plurality of user groups of the computing environment based on the determined plurality of user-provided aliases and on the respective popularity values associated with the distinct user-provided aliases in the plurality of user-provided aliases;

responsive to a request from a first user specifying the first resource, providing, to the first user, the suggested alias for the first resource that is associated with the user group of the first user; and associating the suggested alias with the first resource, whereby the first user can refer to the first resource of the computing environment using the suggested alias.

2. The method of claim 1, wherein the first resource comprises at least one of: (i) a hardware resource, and (ii) a software resource in the computing environment, wherein the hardware resource is identified by a physical name, wherein the suggested alias corresponds with one of the user-provided aliases, and wherein providing the suggested alias associated with the first resource to the first user further comprises providing the respective popularity of the corresponding one of the user-provided aliases to the first user.

3. The method of claim 1, wherein the plurality of user-provided aliases are not identifiers of the user account, wherein a length of the suggested alias is limited by a number of displayable characters on a display device, wherein generating a suggested alias for the first resource of the computing environment is further based on user data associated with the first user, and wherein the user data specifies at least one of a group, a role or a task of the first user.

4. The method of claim 1, wherein generating a suggested alias for the first resource of the computing environment further comprises:
  determining one or more groups of users within the plurality of users, wherein each group is associated with a respective shared user-provided alias;
  determining similarities between the first user and a first group of the one or more groups of users; and
  selecting a shared user-provided alias associated with the first group of users as the suggested alias for the first resource.

5. The method of claim 1, further comprising:
  generating a plurality of other suggested aliases for the first resource of the computing environment based on the determined plurality of user-provided aliases; and
  responsive to the request from the first user to view the first resource, providing the plurality of other suggested aliases to the first user.

6. The method of claim 1, wherein generating a suggested alias for the first resource of the computing environment further comprises:
  for at least one of the user-provided aliases for the first resource, determining one or more data elements contained in the user-provided alias, wherein the generated suggested alias is further based on the determined one or more data elements.

7. A system, comprising:
  a processor; and
  a memory containing a program that, when executed by the processor, performs an operation for managing resources in a computing environment having a plurality of users, comprising:
    determining a plurality of user-provided aliases for a first resource of the computing environment, wherein each user-provided alias in the plurality of user-provided aliases was defined, by a respective user from the plurality of users of the computing environment, as an alias for the first resource that is local to the respective user, and wherein each distinct user-provided alias in the plurality of user-provided aliases is associated with a respective popularity value reflecting a frequency of use of the respective user-provided alias, wherein the first resource is not a user account;
    generating a suggested alias for the first resource of the computing environment based on the determined plurality of user-provided aliases and on the respective popularity values associated with the distinct user-provided aliases in the plurality of user-provided aliases;
    responsive to a request from a first user specifying the first resource, providing, to the first user, the suggested alias for the first resource that is associated with the user group of the first user; and
    associating the suggested alias with the first resource, whereby the first user can refer to the first resource of the computing environment using the suggested alias.

8. The system of claim 7, wherein the first resource comprises at least one of: (i) a hardware resource, and (ii) a software resource in the computing environment, wherein the hardware resource is identified by a physical name, wherein the suggested alias corresponds with one of the user-provided aliases, and wherein providing the suggested alias associated with the first resource to the first user further comprises providing the respective popularity of the corresponding one of the user-provided aliases to the first user.

9. The system of claim 7, wherein the plurality of user-provided aliases are not identifiers of the user account, wherein a length of the suggested alias is limited by a number of displayable characters on a display device, wherein generating a suggested alias for the first resource of the computing environment is further based on user data associated with the first user, and wherein the user data specifies at least one of a group, a role or a task of the first user.

10. The system of claim 7, wherein generating a suggested alias for the first resource of the computing environment further comprises:
  determining one or more groups of users within the plurality of users, wherein each group is associated with a respective shared user-provided alias;
  determining similarities between the first user and a first group of the one or more groups of users; and
  selecting a shared user-provided alias associated with the first group of users as the suggested alias for the first resource.

11. The system of claim 7, the operation further comprising:
  generating a plurality of other suggested aliases for the first resource of the computing environment based on the determined plurality of user-provided aliases; and
  responsive to the request from the first user to view the first resource, providing the plurality of other suggested aliases to the first user.

12. The system of claim 7, wherein generating a suggested alias for the first resource of the computing environment further comprises:

for at least one of the user-provided aliases for the first resource, determining one or more data elements contained in the user-provided alias, wherein the generated suggested alias is further based on the determined one or more data elements.

13. A computer program product for managing resources in a computing environment having a plurality of users, comprising:
a non-transitory computer-readable storage medium having computer readable program code embodied therewith, the computer readable program code comprising:
computer readable program code to determine a plurality of user-provided aliases for a first resource of the computing environment, wherein each user-provided alias in the plurality of user-provided aliases was defined, by a respective user from the plurality of users of the computing environment, as an alias for the first resource that is local to the respective user, and wherein each distinct user-provided alias in the plurality of user-provided aliases is associated with a respective popularity value reflecting a frequency of use of the respective user-provided alias, wherein the first resource is not a user account;
computer readable program code to generate a suggested alias for the first resource of the computing environment based on the determined plurality of user-provided aliases and on the respective popularity values associated with the distinct user-provided aliases in the plurality of user-provided aliases;
computer readable program code to, responsive to a request from a first user specifying the first resource, provide, to the first user, the suggested alias for the first resource that is associated with the user group of the first user; and
computer readable program code to associate the suggested alias with the first resource, whereby the first user can refer to the first resource of the computing environment using the suggested alias.

14. The computer program product of claim 13, wherein the first resource comprises at least one of: (i) a hardware resource, and (ii) a software resource in the computing environment, wherein the hardware resource is identified by a physical name, wherein the computer readable program code to generate a suggested alias for the first resource of the computing environment is further based on user data associated with the first user, wherein the user data specifies at least one of a group, a role or a task of the first user.

15. The computer program product of claim 13, wherein the plurality of user-provided aliases are not identifiers of the user account, wherein a length of the suggested alias is limited by a number of displayable characters on a display device, wherein the computer readable program code to generate a suggested alias for the first resource of the computing environment further comprises:
computer readable program code to determine one or more groups of users within the plurality of users, wherein each group is associated with a respective shared user-provided alias;
computer readable program code to determine similarities between the first user and a first group of the one or more groups of users; and
computer readable program code to select a shared user-provided alias associated with the first group of users as the suggested alias for the first resource.

16. The computer program product of claim 13, further comprising:
computer readable program code to generate a plurality of other suggested aliases for the first resource of the computing environment based on the determined plurality of user-provided aliases; and
computer readable program code to, responsive to the request from the first user to view the first resource, provide the plurality of other suggested aliases to the first user.

17. The computer program product of claim 13, wherein the computer readable program code to generate a suggested alias for the first resource of the computing environment further comprises:
computer readable program code to, for at least one of the user-provided aliases for the first resource, determine one or more data elements contained in the user-provided alias, wherein the generated suggested alias is further based on the determined one or more data elements.

* * * * *